(12) United States Patent
Kurosumi

(10) Patent No.: US 10,010,990 B2
(45) Date of Patent: Jul. 3, 2018

(54) MACHINE TOOL

(71) Applicant: FANUC Corporation, Yamanashi (JP)

(72) Inventor: Yasuhiko Kurosumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/393,431

(22) Filed: Dec. 29, 2016

(65) Prior Publication Data

US 2017/0190011 A1 Jul. 6, 2017

(30) Foreign Application Priority Data

Jan. 5, 2016 (JP) ................................ 2016-000486

(51) Int. Cl.
*B65G 45/22* (2006.01)
*B23Q 11/00* (2006.01)
*B23Q 17/24* (2006.01)
*B65G 45/12* (2006.01)

(52) U.S. Cl.
CPC ...... *B23Q 11/0057* (2013.01); *B23Q 17/2452* (2013.01); *B65G 45/12* (2013.01)

(58) Field of Classification Search
CPC ........ B65G 19/10; B65G 45/10; B65G 45/12; B65G 45/20; B65G 45/26
USPC ................. 198/493, 494, 495, 498
See application file for complete search history.

(56) References Cited

U.S. PATENT DOCUMENTS

| | | | | |
|---|---|---|---|---|
| 6,035,996 A * | 3/2000 | Swift | ..................... | B65G 45/22 198/495 |
| 6,601,691 B1 * | 8/2003 | Enomoto | ........... | B23Q 11/0057 198/495 |
| 7,410,569 B1 * | 8/2008 | Tilev | .................. | B01D 21/0012 210/167.02 |
| 2002/0134648 A1 * | 9/2002 | Enomoto | ........... | B23Q 11/0057 198/495 |
| 2002/0166808 A1 * | 11/2002 | Hori | .................... | B23Q 11/0057 210/298 |
| 2003/0066179 A1 * | 4/2003 | Shiba | ................. | B23Q 11/0042 29/426.3 |
| 2009/0250082 A1 * | 10/2009 | Miller | ..................... | B08B 3/022 134/10 |

(Continued)

FOREIGN PATENT DOCUMENTS

| | | |
|---|---|---|
| JP | 4-84222 U | 7/1992 |
| JP | 2010137931 A | 6/2010 |

OTHER PUBLICATIONS

Office Action in JP Application No. 2016-000486, dated Dec. 5, 2017, 6 pp.

*Primary Examiner* — James R Bidwell
(74) *Attorney, Agent, or Firm* — Hauptman Ham, LLP

(57) ABSTRACT

A machine tool with a chip evacuation device according to the present invention is provided with a cleaning mechanism for cleaning a part or the whole of the chip evacuation device and a control unit configured to control respective operations of the chip evacuation device and the cleaning mechanism in association with each other. By using an electric motor, such as a synchronous motor capable of position control, as a power source for the chip evacuation device, the respective operations of the chip evacuation device and the cleaning mechanism can be associated with each other to effectively clean the chip evacuation device.

15 Claims, 14 Drawing Sheets

(56) References Cited

U.S. PATENT DOCUMENTS

2010/0200369 A1\* 8/2010 Suutarinen ........... B23Q 11/005
  198/495
2014/0326326 A1\* 11/2014 Antoun ................... B08B 3/14
  137/15.01

\* cited by examiner

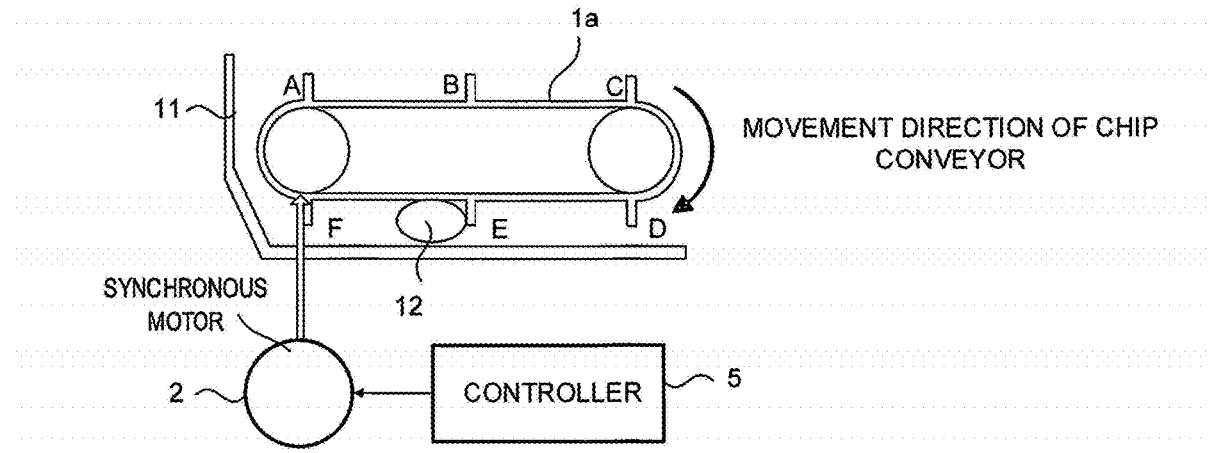
FIG.10A  CHIPS REMAINS IN PART E
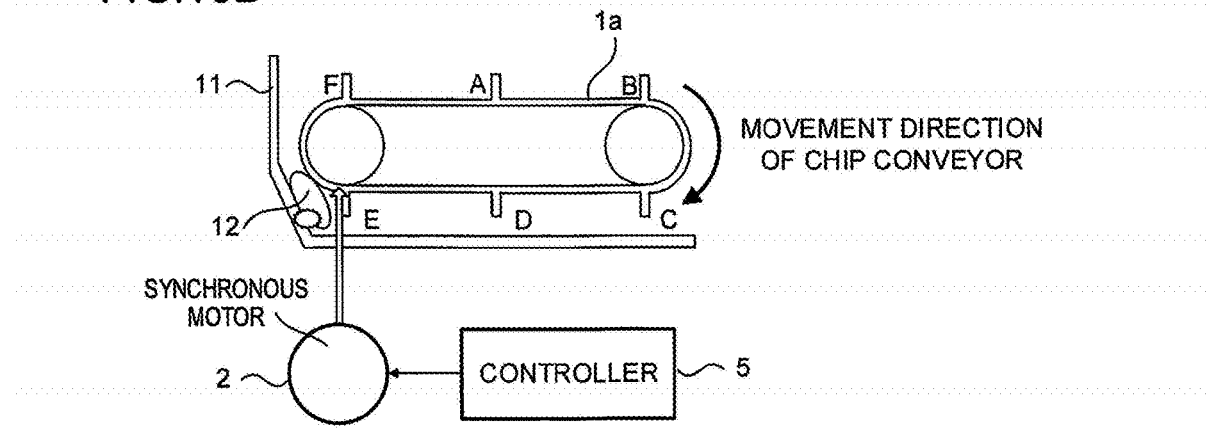
FIG.10B  REMAINING CHIPS SANDWICHED BETWEEN PART E AND HOUSING
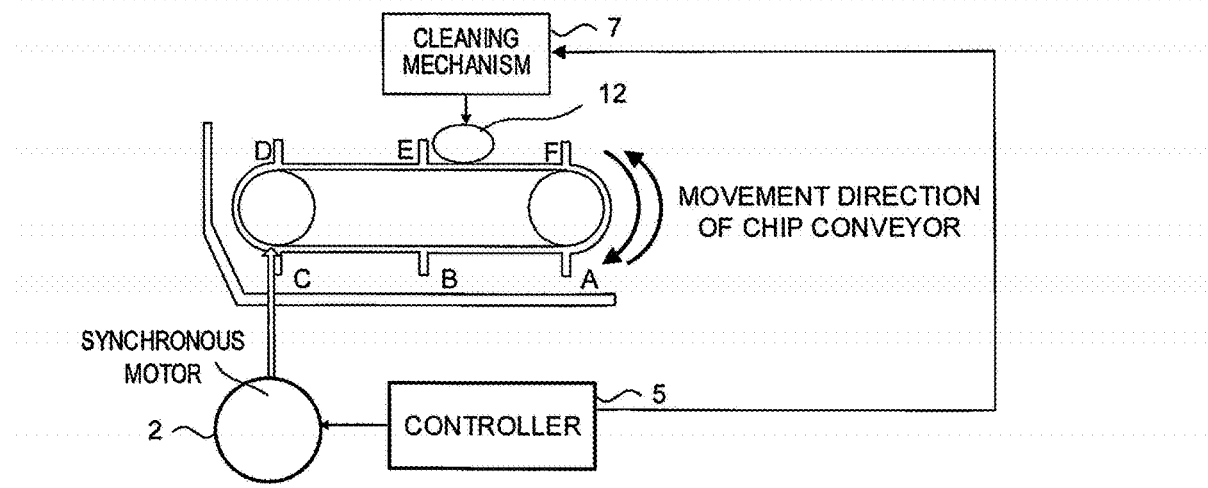
FIG.10C  CHIP CONVEYOR MOVED TO POSITION FOR CLEANING CLEANING MECHANISMS OF PLURALITY OF CHIP EVACUATION DEVICES CONTROLLED BY CONTROLLER OF SINGLE MACHINE TOOL CLEANING MECHANISM OF CHIP EVACUATION DEVICE CONTROLLED BY CONTROLLER OUTSIDE MACHINE TOOL

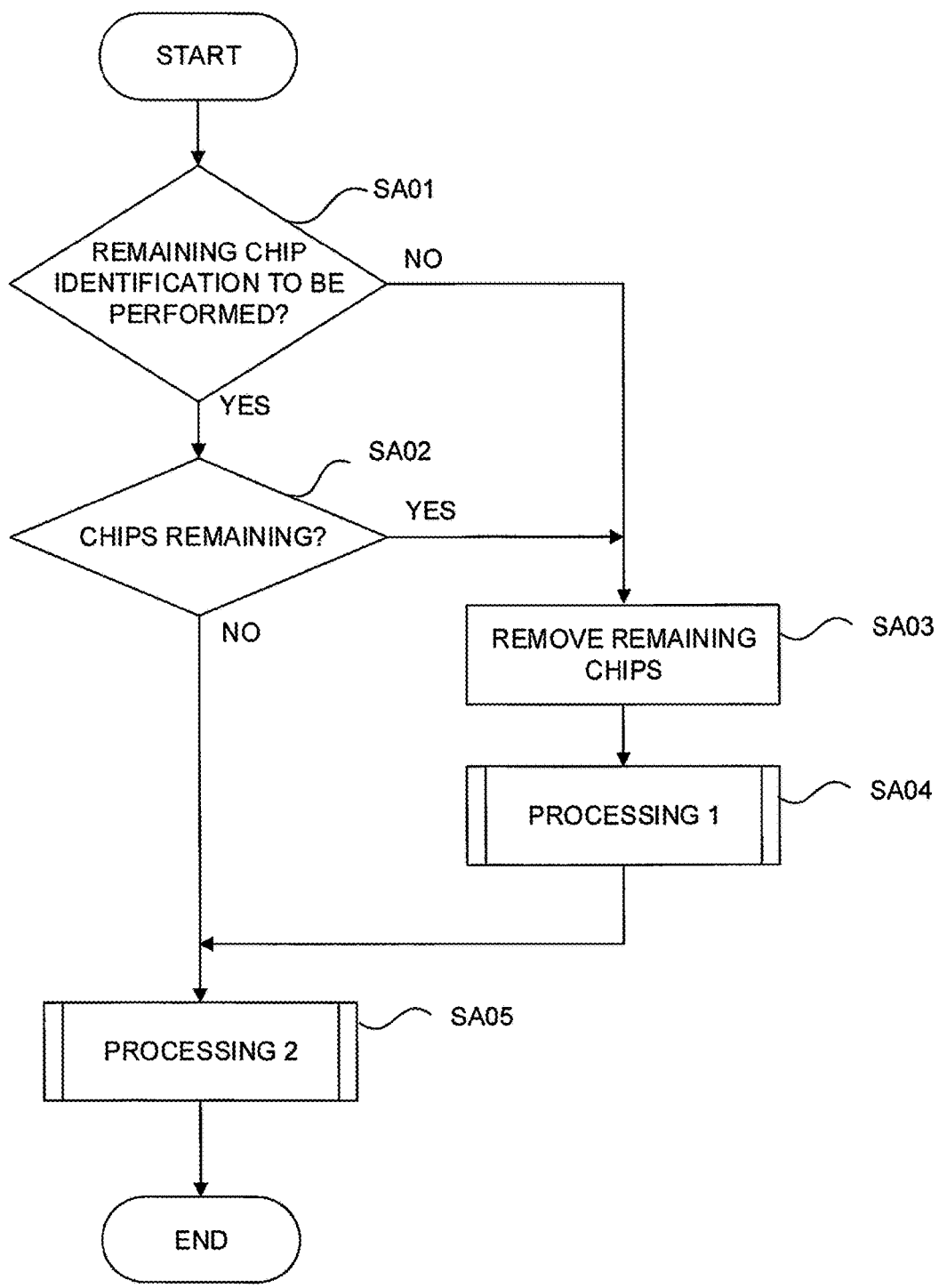

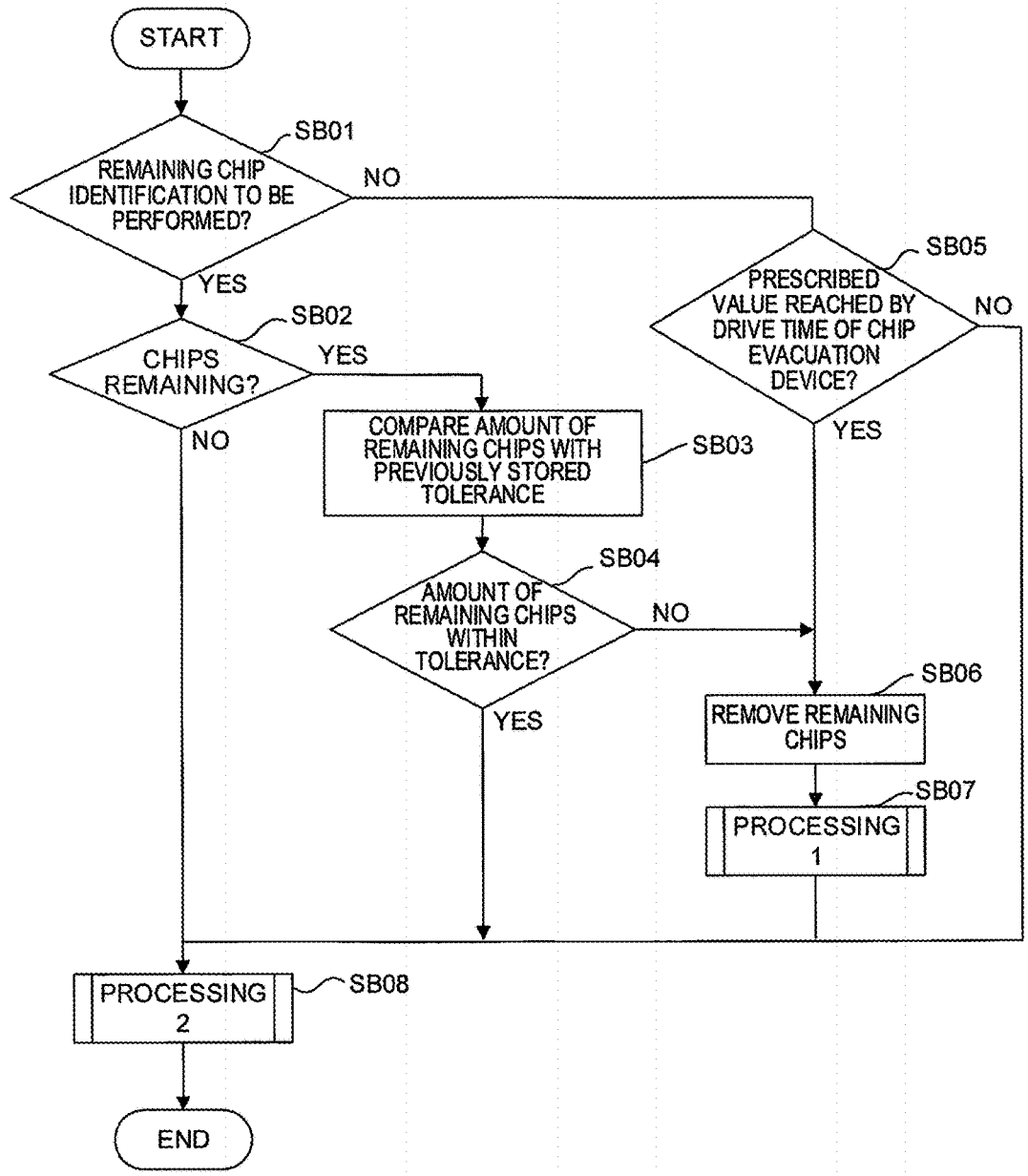

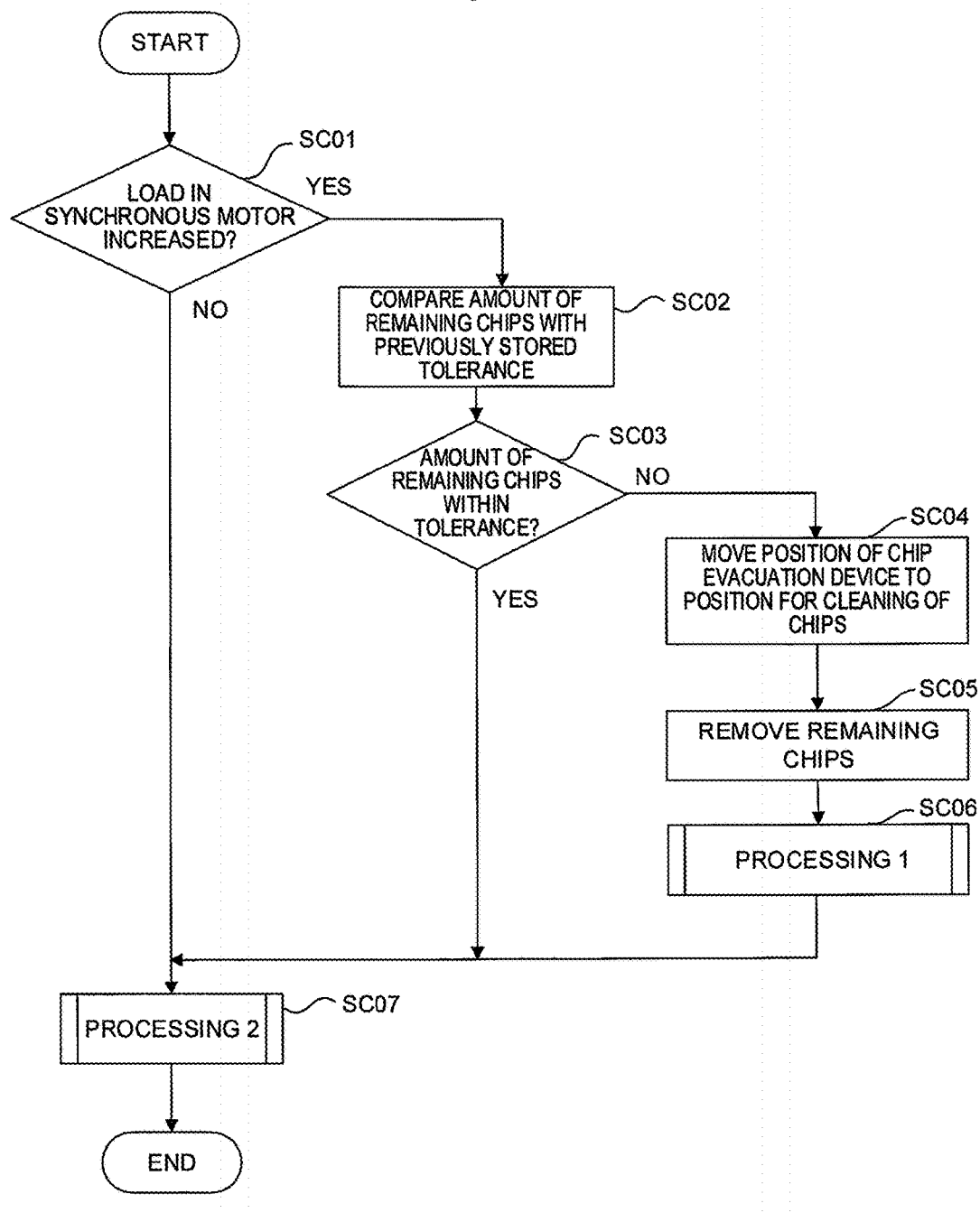

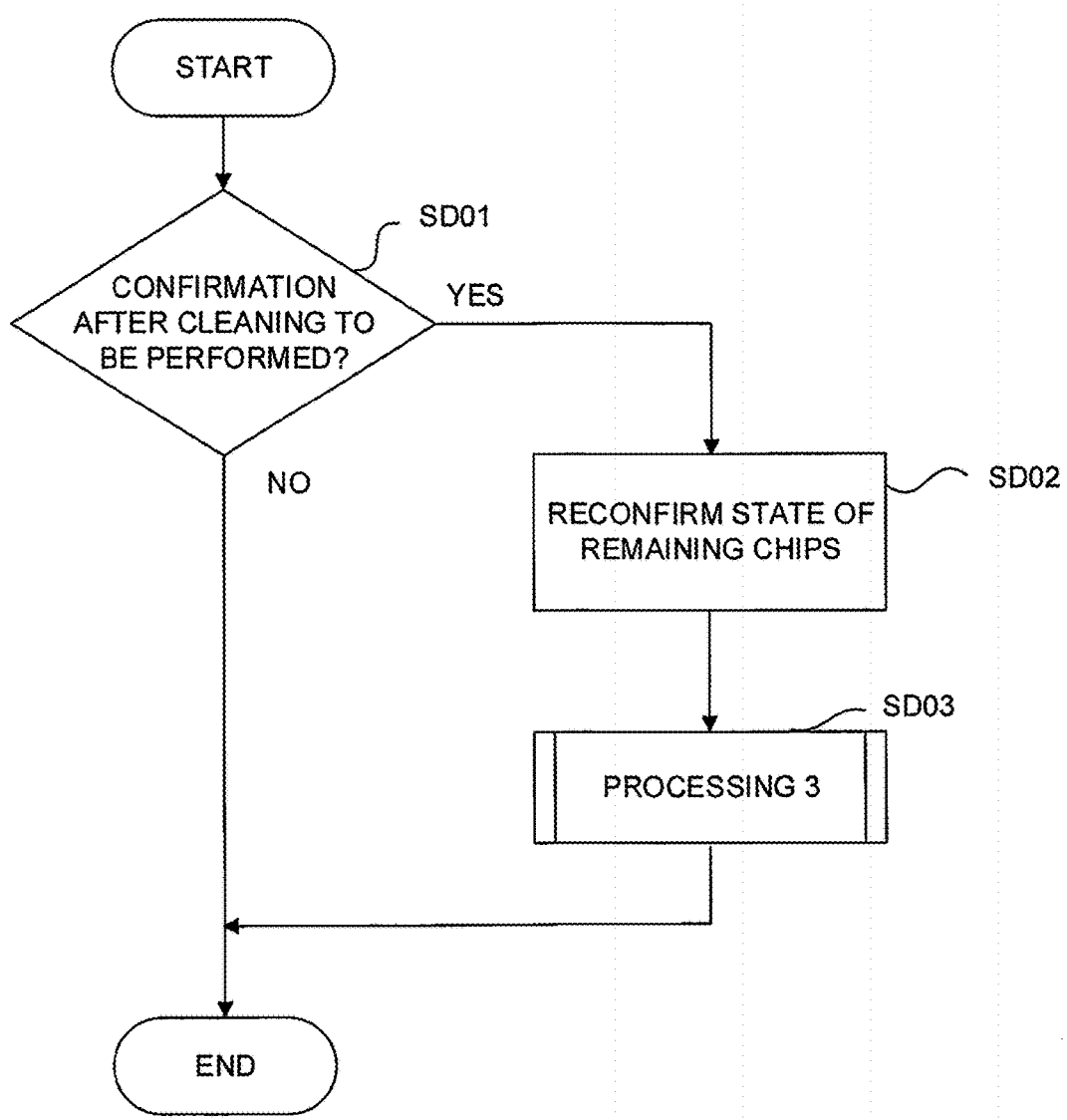

MACHINE TOOL

RELATED APPLICATIONS

The present application claims priority to Japanese Patent Application Number 2016-000486, filed Jan. 5, 2016, the disclosure of which is hereby incorporated by reference herein in its entirety.

BACKGROUND OF THE INVENTION

Field of the Invention

The present invention relates to a machine tool with a chip evacuation device.

Description of the Related Art

In a chip evacuation device such as a chip conveyor, as shown in FIG. 18, an induction motor and an electromagnetic switch or contactor are generally used as drive sources. If the induction motor is used, the feeding state for the induction motor is changed (e.g., inverted) to stop the induction motor when the driving current reaches a limit current value. Moreover, the feeding state for the induction motor is changed (e.g., inverted) to stop the induction motor when its surface temperature reaches a limit temperature.

An inverter is used in place of the electromagnetic switch or contactor in a preceding example disclosed in Japanese Patent Application Laid-Open No. 2010-137931.

In prior art techniques disclosed in Japanese Patent Application Laid-Open No. 2010-137931 and the like, an induction motor is used to drivingly control a chip evacuation device 1. Since the induction motor cannot be controlled in position, however, there is a problem that the operation of the chip evacuation device 1 cannot be synchronized with those of other devices. Moreover, the prior art chip evacuation device 1 does not comprise any cleaning device, so that there is another problem that the chip evacuation device 1 itself cannot be cleaned.

SUMMARY OF THE INVENTION

Accordingly, the object of the present invention is to provide a machine tool with a chip evacuation comprising a cleaning mechanism for cleaning the chip evacuation device itself in synchronism with the operation of the chip evacuation device.

A machine tool according to the present invention, which is equipped with a chip evacuation device configured to evacuate chips produced in the machine tool to the outside, comprises a cleaning mechanism for cleaning a part or the whole of the chip evacuation device and a control unit configured to control respective operations of the chip evacuation device and the cleaning mechanism in association with each other.

The machine tool of the present invention is characterized in that a power source for the chip evacuation device is a synchronous motor.

The machine tool of the present invention is characterized by further comprising a remaining chip state monitoring unit configured to monitor a remaining chip state in a drive part of the chip evacuation device, and in that the control unit determines execution of the cleaning of the chip evacuation device based on the result of the monitoring and controls the respective operations of the chip evacuation device and the cleaning mechanism in association with each other based on the result of the determination.

The machine tool of the present invention is characterized in that the remaining chip state monitoring unit is an image pickup device.

The machine tool of the present invention is characterized in that the remaining chip state monitoring unit comprises an image pickup device and a reflector and/or a refractor, and the image pickup device monitors the remaining chip state for the chip evacuation device through the reflector and/or the refractor.

The machine tool of the present invention is characterized in that the remaining chip state monitoring unit uses load information acquired from the synchronous motor.

The machine tool of the present invention is characterized in that the control unit identifies an area of the chip evacuation device in which the chips remain, based on information from the remaining chip state monitoring unit, and controls the chip evacuation device and the cleaning mechanism to clean the identified remaining chip area.

The machine tool of the present invention is characterized in that the control unit causes the remaining chip state monitoring unit to identify the result of the cleaning after the cleaning by the cleaning mechanism and issues a notification to the effect that re-cleaning or manual cleaning is necessary, based on the identified result of the cleaning.

The machine tool of the present invention is characterized in that the control unit performs the re-cleaning by a cleaning method different from a previous cleaning method.

The machine tool of the present invention is characterized in that the control unit stores as history information a record on identification of the remaining chip state and/or the content of the cleaning performed based on the result of the identification.

The machine tool of the present invention is characterized in that the control unit is a controller installed outside the machine tool.

The machine tool of the present invention is characterized in that the cleaning mechanism is movable by an automatic conveying device.

The machine tool of the present invention is characterized in that the image pickup device is movable by an automatic conveying device.

The machine tool of the present invention is characterized in that the image pickup device and the reflector and/or the refractor are movable by an automatic conveying device.

The machine tool of the present invention is characterized in that the automatic conveying device is a robot.

According to the present invention, since the respective operations of a drive source or part and a cleaning mechanism of a chip evacuation device can be associated with each other, effective automatic cleaning of the chip evacuation device can be achieved, so that the operating rate of equipment can be expected to be improved.

BRIEF DESCRIPTION OF THE DRAWINGS

The above and other objects and features of the present invention will be obvious from the ensuing description of embodiments with reference to the accompanying drawings, in which:

FIG. 2 is a view showing an example of execution in which a chip conveyor 1a is used as a chip evacuation device 1 and which is incorporated with a cleaning mechanism 7 for cleaning chips deposited on the chip conveyor 1a;

FIG. 4 is a diagram showing an example of execution in which the chip conveyor 1a is used as the chip evacuation device 1 and which is incorporated with the cleaning mechanism 7 for cleaning chips deposited on the chip conveyor 1a;

FIG. 6 is a view showing an example of execution in which the chip conveyor 1a is used as the chip evacuation device 1 and which is incorporated with the cleaning mechanism 7 for cleaning chips deposited on the chip conveyor 1a;

FIG. 10A is a diagram showing a state in which chips 12 remain in a part E, among diagrams showing an example of execution in which a remaining chip area is identified based on loaded conditions for a synchronous motor;

FIG. 10B is a diagram showing a state in which the remaining chips 12 are sandwiched between the part E and a housing 11;

FIG. 10C is a diagram showing a state in which the chip conveyor 1a is moved to a position for cleaning;

FIG. 12 is a flowchart of basic control of the machine tool with the chip evacuation device according to the one embodiment of the present invention;

FIG. 13 is a flowchart of control of the machine tool with the chip evacuation device according to the one embodiment of the present invention to which cleaning necessity determination is added;

FIG. 14 is a flowchart of control of the machine tool with the chip evacuation device according to the one embodiment of the present invention to which processing for identifying the remaining chip area from load information is added;

FIG. 15 is a flowchart of processing for confirming the effect of the cleaning;

DETAILED DESCRIPTION OF THE PREFERRED EMBODIMENTS

Figure 1:
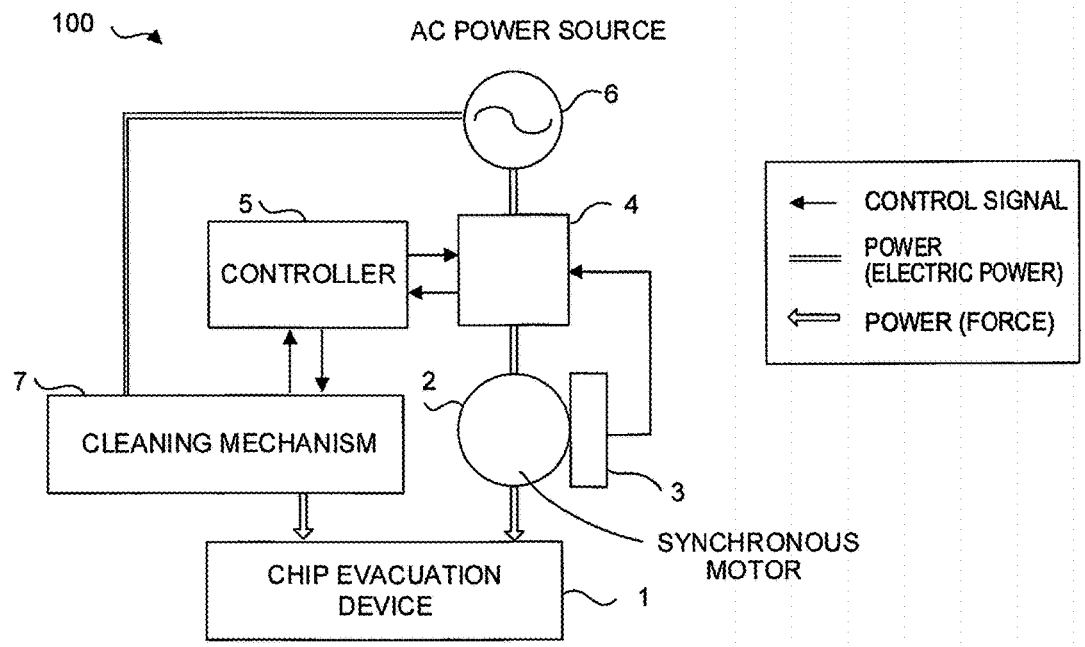
FIG. 1 is a configuration diagram showing a principal part of a machine tool with a chip evacuation device according to one embodiment of the present invention.

An embodiment of the present invention will now be described with reference to the accompanying drawings. The same reference numerals are used to designate those components which are identical or similar to their conventional counterparts.

FIG. 1 is a configuration diagram showing a principal part of a machine tool with a chip evacuation device according to one embodiment of the present invention. A machine tool 100 according to the present embodiment comprises a chip evacuation device 1, and a drive part of the chip evacuation device 1 is driven by a synchronous motor 2. A synchronous motor control device (servo amplifier) 4 controls the synchronous motor 2 by means of power supply from an AC power source 6 in response to a command signal from a controller 5, receives a signal from a rotation sensor (pulse coder) 3 mounted on the synchronous motor 2, and feeds back the signal to the controller 5. A cleaning mechanism 7 receives the power supply from the AC power source 6 and cleans chips deposited on or adhering to the chip evacuation device 1 in response to a command signal from the controller 5.

The synchronous motor 2 need not always be mounted on the main body of the chip evacuation device 1 and may be made separable from the chip evacuation device 1 so that it can be moved and connected for drive by an automatic conveying device (not shown) only when necessary. However, in view of the convenience of the device configuration, the synchronous motor 2 should preferably be included in or located close to the main body of the chip evacuation device 1. On the other hand, other elements need not always be included in the chip evacuation device 1 itself.

Figure 2:
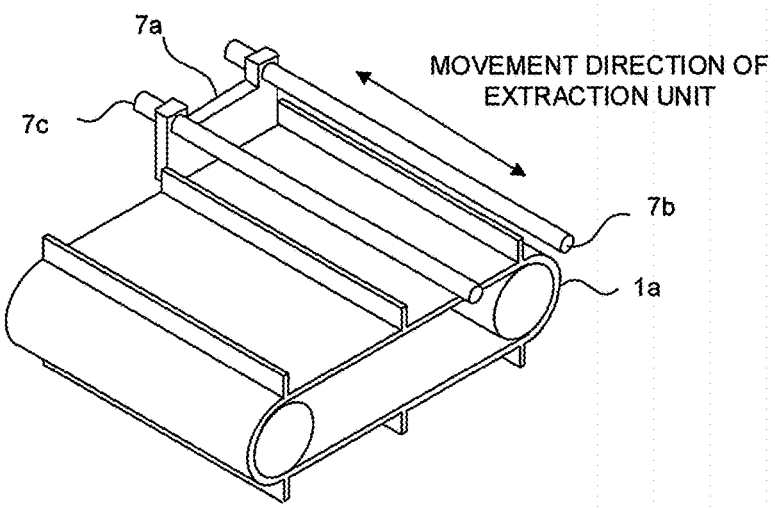

FIG. 2 shows an example of execution in which a chip conveyor 1a is used as the chip evacuation device 1 and which is incorporated with the cleaning mechanism 7 for cleaning chips deposited on the chip conveyor 1a. In the example shown in FIG. 2, the cleaning mechanism 7 comprises an extraction unit 7a supported by a ball screw 7b, which is driven by a drive part (not shown), and a support rod 7c. The extraction unit 7a is moved in the direction of the arrow in FIG. 2 by the drive of the ball screw 7b, thereby cleaning the chips deposited on the chip conveyor 1a. The controller 5 controls the synchronous motor 2 to move the chip conveyor 1a so that the area of the chip conveyor 1a on which the chips are deposited reaches a position in which the extraction unit 7a reciprocates before the cleaning by the extraction unit 7a is started. Thereafter, the controller 5 controls the drive part for the ball screw 7b to make the extraction unit 7a clean the chips.

Figure 3:
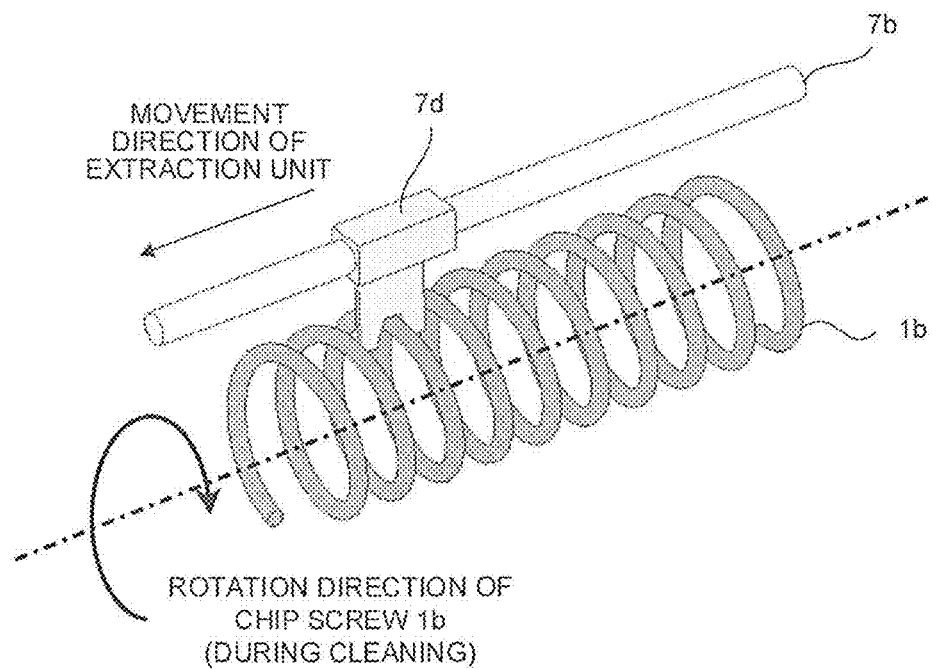
FIG. 3 is a view showing the cleaning mechanism 7 as a mechanism for cleaning chips adhering to a chip screw 1b for use as the chip evacuation device 1.

FIG. 3 shows the cleaning mechanism 7 as a mechanism for cleaning chips adhering to a chip screw 1b for use as the chip evacuation device 1. In the example shown in FIG. 3, the cleaning mechanism 7 comprises an extraction unit 7d supported by the ball screw 7b that is driven by the drive part (not shown). The extraction unit 7d is moved in the direction of the arrow in FIG. 3 by the drive of the ball screw 7b, thereby cleaning chips deposited in the gap of the chip screw 1b. The controller 5 synchronizes the rotational speed of the chip screw 1b with that of the ball screw 7b, thereby controlling the extraction unit 7d to move in the gap of the chip screw 1b to clean the chips.

Figure 4:
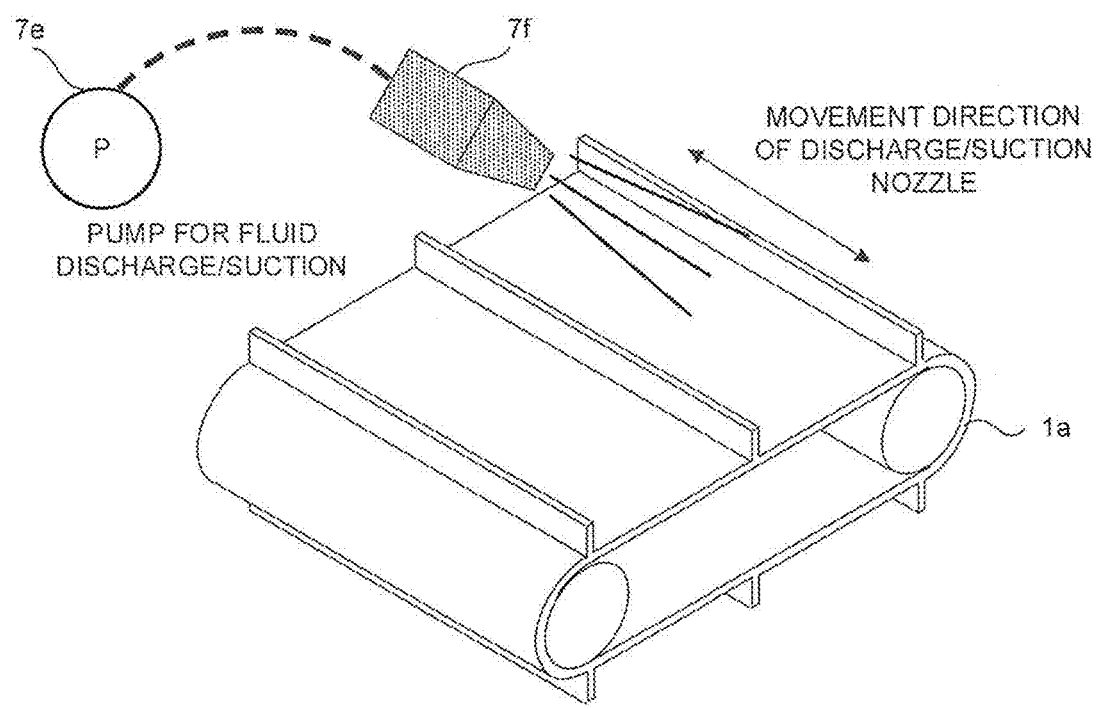

FIG. 4 shows an example of execution in which the chip conveyor 1a is used as the chip evacuation device 1 and which is incorporated with the cleaning mechanism 7 for cleaning chips deposited on the chip conveyor 1a. In the example shown in FIG. 4, the cleaning mechanism 7 comprises a pump 7e used for discharge/suction of a fluid and a fluid discharge/suction nozzle 7f driven by a drive part (not shown). The discharge/suction nozzle 7f is moved in the direction of the arrow in FIG. 4 by the drive part (not shown) so that chips deposited on the chip conveyor 1a are washed away with the fluid or drawn in together with the fluid for cleaning. The controller 5 controls the synchronous motor 2 to move the chip conveyor 1a so that the area of the chip conveyor 1a on which the chips are deposited reaches a position in which the discharge/suction nozzle 7f is movable before the cleaning mechanism 7 starts the cleaning. Thereafter, the controller 5 controls the drive part for the cleaning mechanism 7 to clean the chips. Moreover, the direction of discharge/suction, delivery, or suction amount may be changed depending on the deposition conditions of the chips.

Figure 5:
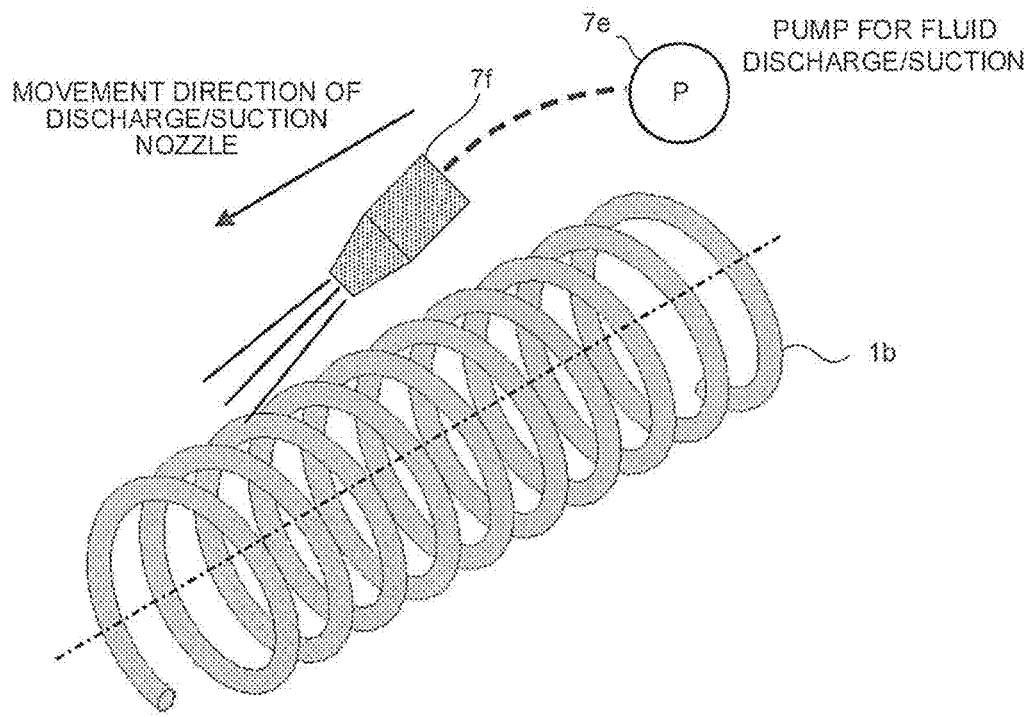
FIG. 5 is a diagram showing the cleaning mechanism 7 as the mechanism for cleaning chips adhering to the chip screw 1b for use as the chip evacuation device 1.

FIG. 5 shows the cleaning mechanism 7 as the mechanism for cleaning chips adhering to the chip screw 1b for use as the chip evacuation device 1. In the example shown in FIG. 5, the cleaning mechanism 7 comprises the pump 7e used for discharge/suction of a fluid and the fluid discharge/suction nozzle 7f driven by a drive part (not shown). The discharge/suction nozzle 7f is moved in the direction of the arrow in FIG. 5 by the drive part (not shown) so that the chips adhering to the chip screw 1b are washed away with the fluid or drawn in together with the fluid for cleaning. The controller 5 synchronizes the rotational speed of the chip screw 1b with the moving speed of the discharge/suction nozzle 7f, thereby controlling the discharge/suction nozzle 7f so that it can clean the entire gap of the chip screw 1b. Moreover, the direction of discharge/suction, delivery, or suction amount may be changed depending on the deposition conditions of the chips.

Figure 6:
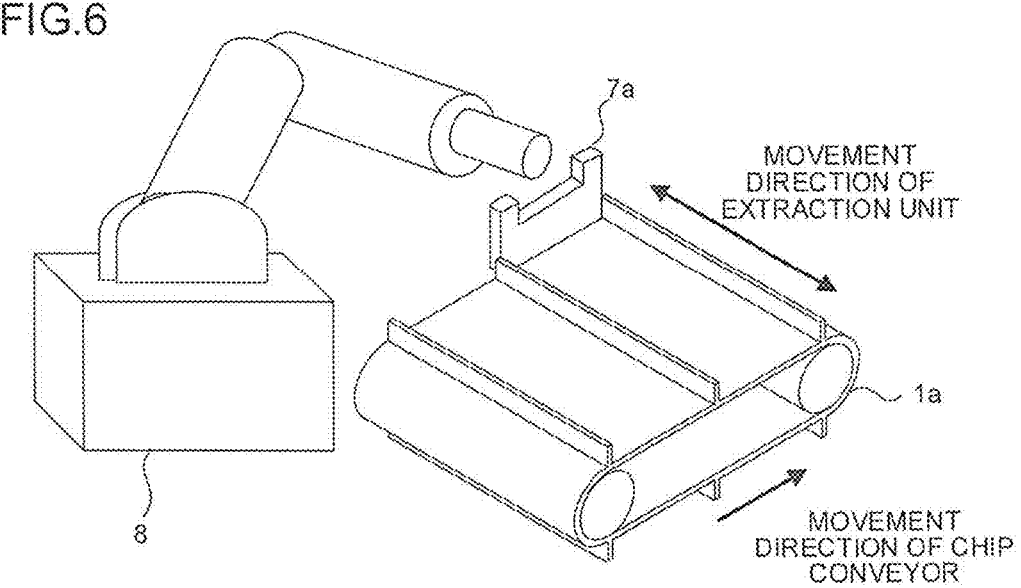

FIG. 6 shows an example of execution in which the chip conveyor 1a is used as the chip evacuation device 1 and which is incorporated with the cleaning mechanism 7 for cleaning chips deposited on the chip conveyor 1a. In the example shown in FIG. 6, the cleaning mechanism 7 comprises a robot 8, such as an automatic conveying device, and the extraction unit 7a supported by a hand attached to the distal end of an arm of the robot 8. The extraction unit 7a is moved in the direction of the arrow in FIG. 6 by the drive of the robot 8, thereby cleaning the chips deposited on the chip conveyor 1a. The controller 5 controls the synchronous motor 2 to move the chip conveyor 1a so that the area of the chip conveyor 1a on which the chips are deposited reaches a position in which the extraction unit 7a reciprocates before the robot 8 starts the cleaning by the extraction unit 7a. Thereafter, the controller 5 controls the robot 8 to clean the chips.

Figure 7:
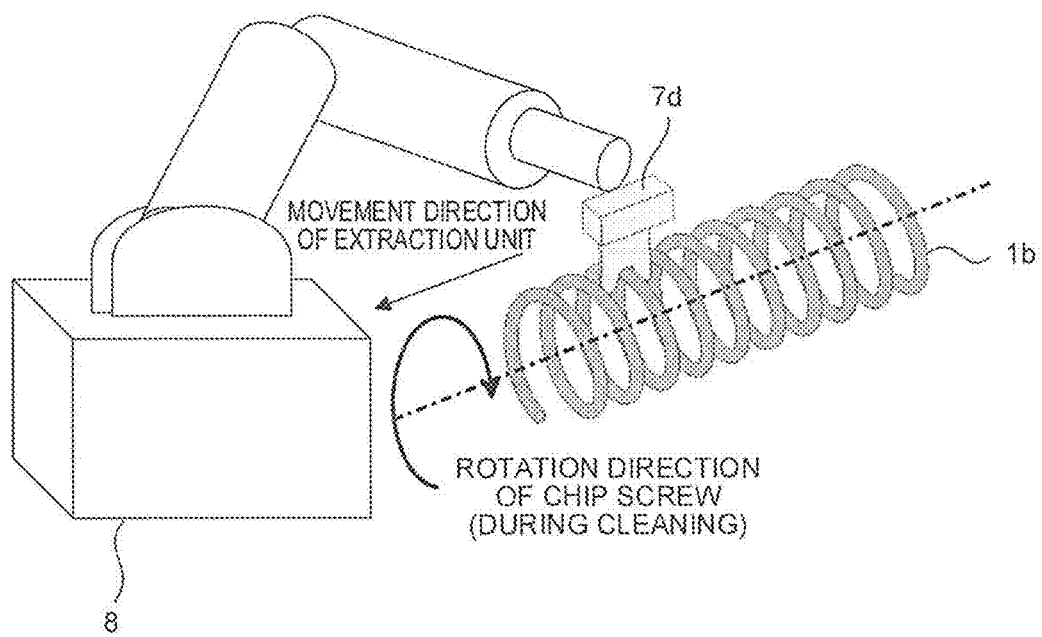
FIG. 7 is a view showing the cleaning mechanism 7 as the mechanism for cleaning chips adhering to the chip screw 1b for use as the chip evacuation device 1.

FIG. 7 shows the cleaning mechanism 7 as the mechanism for cleaning chips adhering to the chip screw 1b for use as the chip evacuation device 1. In the example shown in FIG. 7, the cleaning mechanism 7 comprises the robot 8, such as an automatic conveying device, and the extraction unit 7d supported by a hand attached to the distal end of the arm of the robot 8. The extraction unit 7d is moved in the direction of the arrow in FIG. 7 by the drive of the robot 8, thereby cleaning chips deposited in the gap of the chip screw 1b. The controller 5 synchronizes the rotational speed of the chip screw 1b with the drive of the robot 8, thereby controlling the extraction unit 7d to move in the gap of the chip screw 1b to clean the chips.

Figure 8:
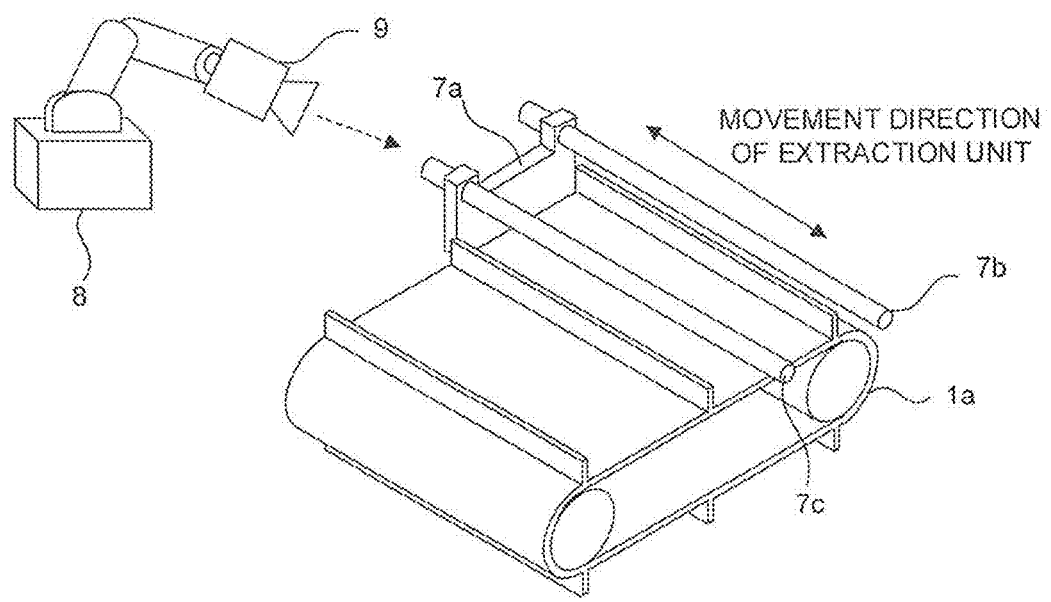
FIG. 8 is a view showing an example of execution in which a remaining chip state monitoring mechanism using an image pickup device 9 is further added to the example of execution shown in FIG. 2.

FIG. 8 shows an example of execution in which a remaining chip state monitoring mechanism using an image pickup device 9 is further added to the example of execution shown in FIG. 2. In the example shown in FIG. 8, the remaining chip state monitoring mechanism comprises the robot 8, such as an automatic conveying device, in which an image pickup device 9 is attached to the distal end of its arm. The controller 5 identifies the area of the chip conveyor 1a on which chips are deposited by an image of the chip conveyor 1a picked up by the image pickup device 9. Then, the controller 5 controls the synchronous motor 2 to move the chip conveyor 1a so that the area of the chip conveyor 1a on which the chips are deposited reaches a position in which the extraction unit 7a reciprocates. Thereafter, the controller 5 controls the drive part for the cleaning mechanism 7 to clean the chips.

Figure 9:
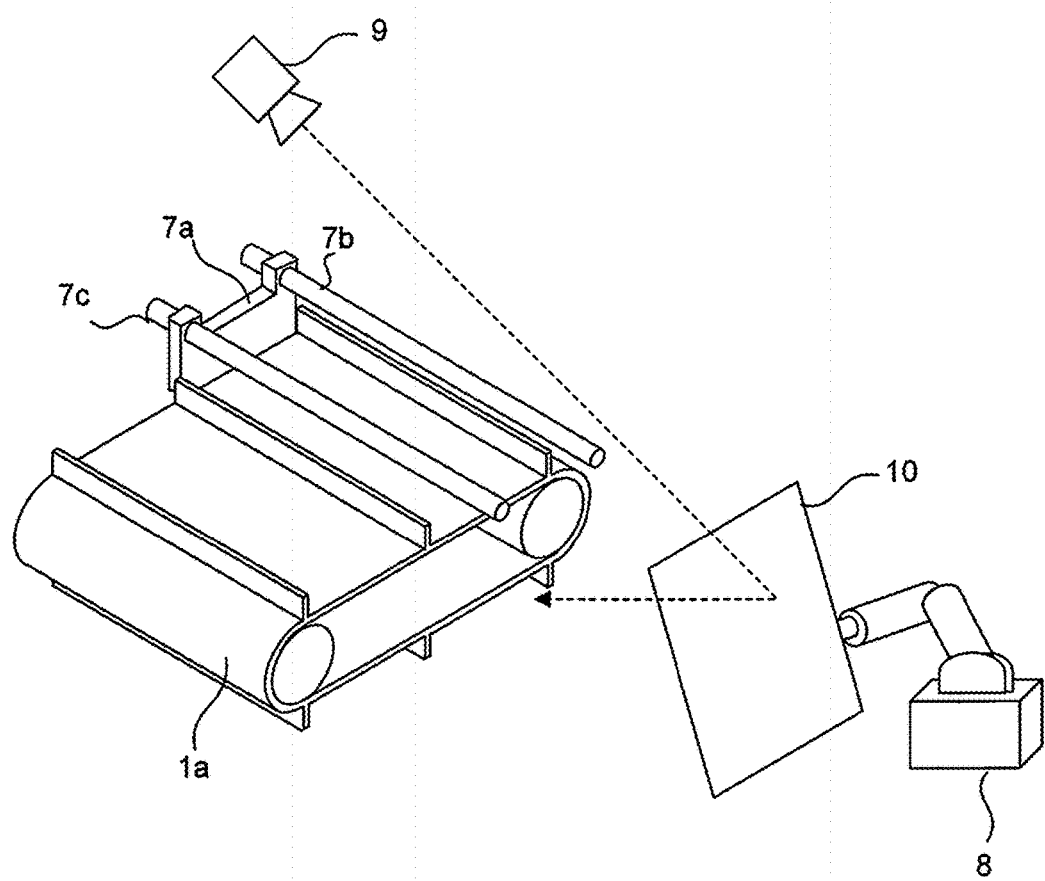
FIG. 9 is a view showing an example of execution in which a remaining chip state monitoring mechanism using an image pickup device 9 and a reflector 10 are further added to the example of execution shown in FIG. 2.

FIG. 9 shows an example of execution in which a remaining chip state monitoring mechanism using an image pickup device 9 and a reflector 10 are further added to the example of execution shown in FIG. 2. In the example shown in FIG. 9, the remaining chip state monitoring mechanism comprises a fixed image pickup device 9 and the robot 8, such as an automatic conveying device, in which a reflector 10, such as a mirror, is attached to the distal end of its arm. In the remaining chip state monitoring mechanism shown in FIG. 9, as compared with that shown in FIG. 8, the use of the compact reflector 10 enables visual recognition of the deposition conditions of chips in a position that cannot be directly visually recognized (or cannot be entered) by the image pickup device 9, and in addition, a reduction in time for the recognition of the chips through a reduction in the moving distance of the image pickup device 9.

Although the robot 8 is used in the examples of FIGS. 8 and 9, an autoloader or workpiece takeout device may be used in place of the robot 8.

FIGS. 10A, 10B and 10C show an example of execution in which a remaining chip area is identified based on loaded conditions for the synchronous motor. As shown in FIG. 10A, the chip conveyor 1a is contained in a housing 11, and the distance between the chip conveyor 1a and the housing 11 is the shortest in the left-side portion of FIG. 10A. In these drawings, symbols A to F denote sweeping mechanism parts of the chip conveyor 1a.

If the chip conveyor 1a continues to be moved as it is when chips 12 remain in the sweeping mechanism part E, a portion at which the distance between the chip conveyor 1a and the housing 11 is short is clogged with the chips 12, as shown in FIG. 10B. At this time, a load in the synchronous motor 2 (that can be detected by a current, output torque, etc.) is increased by a counter force from the chips 12 on the chip evacuation device 1. The controller 5 controls the synchronous motor 2 so that the sweeping mechanism part E is moved to a position for cleaning by the cleaning mechanism 7, and then controls the cleaning mechanism 7 to clean the chips 12 near the sweeping mechanism part E. Alternatively, a tolerance for the load in the synchronous motor 2 may be preset so that the cleaning is prevented if the current load in the synchronous motor 2 is within the tolerance.

Figure 11A:
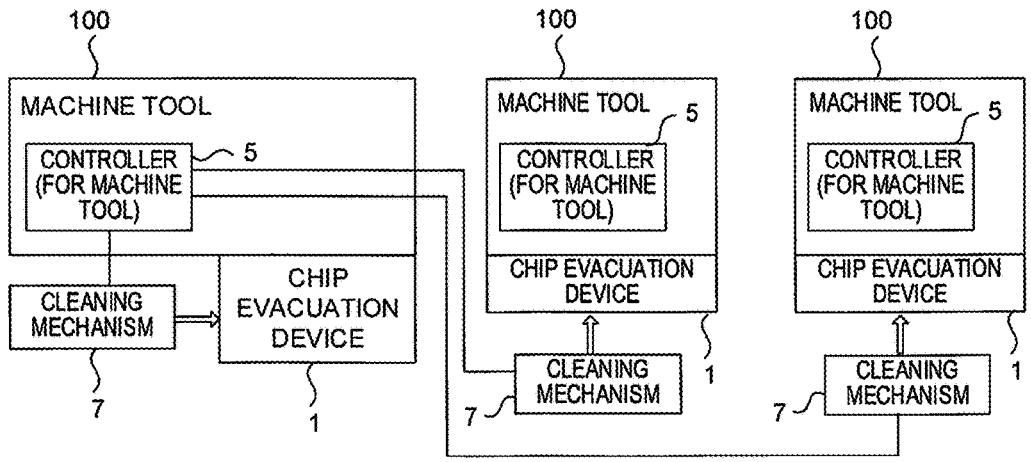
FIG. 11A is a diagram illustrating a case in which a controller 5 for a single machine tool 100 controls cleaning mechanisms 7 of a plurality chip evacuation devices 1, among diagrams showing an example of execution for the case in which the single controller controls the cleaning mechanisms 7 of the plurality of chip evacuation devices 1.

FIG. 11A shows an example of execution in which the controller 5 for a single machine tool 100 controls the cleaning mechanisms 7 of a plurality of chip evacuation devices 1. With this configuration, all the chip evacuation devices 1 can be cleaned even when other machine tools 100 than the machine tool 100 provided with the controller 5 for controlling the cleaning mechanism 7 are powered off, so that wasteful power consumption can be avoided.

Figure 11B:
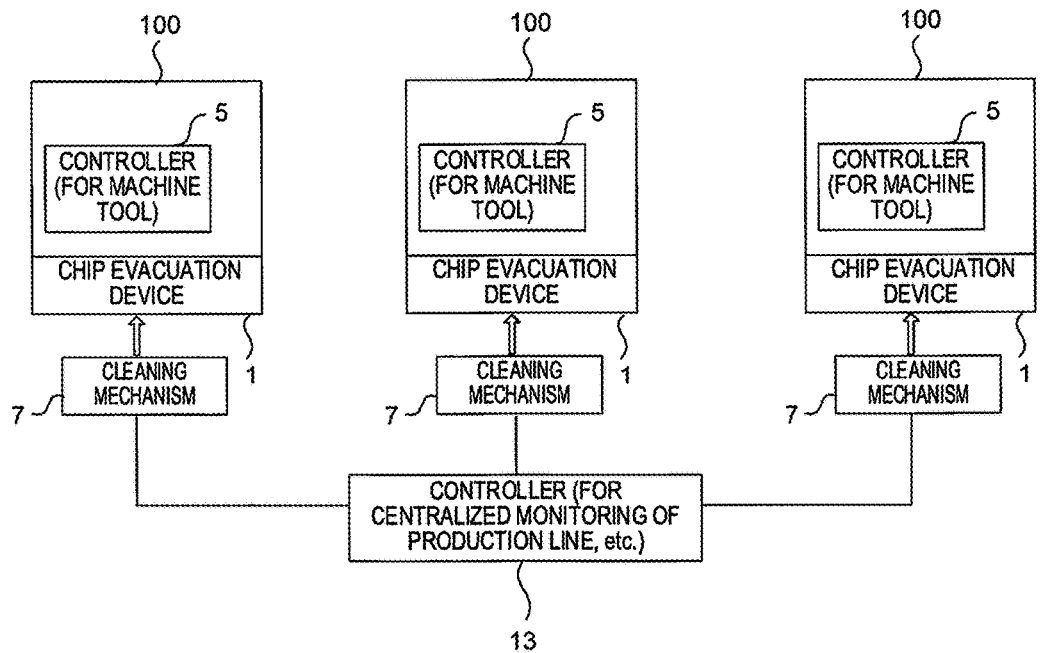
FIG. 11B is a diagram illustrating a case in which the cleaning mechanism 7 of the chip evacuation device 1 is controlled by a controller 13 outside the machine tool.

FIG. 11B shows an example of execution in which the cleaning mechanism 7 of the chip evacuation device 1 is controlled by a controller 13 for centralized monitoring of a production line installed outside the machine tool 100, or the like. With this configuration, the chip evacuation device 1 can be cleaned under the control of the controller 13 even when the machine tool 100 is powered off, so that wasteful power consumption can be avoided.

In the examples of execution of FIGS. 11A and 11B described above, the chip evacuation device 1 and the cleaning mechanism 7 should preferably, though not necessarily, be controlled by the same controller. This is because the chip evacuation device 1 and the cleaning mechanism 7 must be synchronized in operation, depending on their structures, as is also described with reference to FIGS. 2 and 10A to 10C. Alternatively, however, a communication means may be provided between a plurality of controllers to synchronize the chip evacuation device 1 and the cleaning mechanism 7 in operation.

FIG. 12 is a flowchart of basic control of the machine tool with the chip evacuation device according to the one embodiment of the present invention.

[Step SA01] The controller 5 determines whether or not to perform remaining chip identification processing. The execution of the remaining chip identification processing may be made switchable by parameter setting, for example, so that whether or not to perform the remaining chip identification processing can be determined by parameter setting conditions. If the remaining chip identification processing is to be performed, the processing proceeds to Step SA02. If not, the processing proceeds to Step SA03.

[Step SA02] The controller 5 identifies the state of remaining chips by identifying the loaded conditions or the like of the remaining chip state monitoring mechanism and the synchronous motor 2. If the chips remain, the processing proceeds to Step SA03. If not, the processing proceeds to Step SA05.

[Step SA03] The controller 5 controls the operations of the drive part of the chip evacuation device 1 and the cleaning mechanism 7 in association with each other to perform removal (cleaning) of the remaining chips.

[Step SA04] The controller 5 performs Processing 1 (processing for confirming the effect of the cleaning), which will be described later.

[Step SA05] The controller 5 performs Processing 2 (history recording processing), which will be described later.

FIG. 13 is a flowchart of control of the machine tool with the chip evacuation device according to the one embodiment of the present invention to which cleaning necessity determination is added.

[Step SB01] The controller 5 determines whether or not to perform remaining chip identification processing. The execution of the remaining chip identification processing may be made switchable by parameter setting, for example, so that whether or not to perform the remaining chip identification processing can be determined by parameter setting conditions. If the remaining chip identification processing is to be performed, the processing proceeds to Step SB02. If not, the processing proceeds to Step SB05.

[Step SB02] The controller 5 identifies the state of remaining chips by identifying the loaded conditions or the like of the remaining chip state monitoring mechanism and the synchronous motor 2. If the chips remain, the processing proceeds to Step SB03. If not, the processing proceeds to Step SB08.

[Step SB03] The controller 5 compares the amount of remaining chips with a previously stored tolerance for the chips.

[Step SB04] The controller 5 determines whether or not the amount of remaining chips is within the tolerance. If the amount of remaining chips is within the tolerance, the processing proceeds to Step SB08. If not, the processing proceeds to Step SB06.

[Step SB05] The controller 5 determines whether or not the drive time of the chip evacuation device 1 has reached a prescribed value set in a parameter or the like. If the drive time of the chip evacuation device 1 is determined to have reached the prescribed value, the processing proceeds to Step SB06. If not, the processing proceeds to Step SB08.

[Step SB06] The controller 5 controls the operations of the drive part of the chip evacuation device 1 and the cleaning mechanism 7 in association with each other to perform removal (cleaning) of the remaining chips.

[Step SB07] The controller 5 performs Processing 1 (processing for confirming the effect of the cleaning), which will be described later.

[Step SB08] The controller 5 performs Processing 2 (history recording processing), which will be described later, whereupon this processing ends.

FIG. 14 is a flowchart of control of the machine tool with the chip evacuation device according to the one embodiment of the present invention to which processing for identifying the remaining chip area from load information is added.

[Step SC01] The controller 5 determines whether or not the load increases if the drive part of the chip evacuation device 1 is moved to a specific position or angle. If the load increases at the specific position or angle, it is determined that the chips remain in the area in which the load increases, whereupon the processing proceeds to Step SC02. If not, the processing proceeds to Step SC07.

[Step SC02] The controller 5 compares the amount of remaining chips estimated from the magnitude of the load or the like with the previously stored tolerance for the chips.

[Step SC03] The controller 5 determines whether or not the amount of remaining chips is within the tolerance. If the amount of remaining chips is within the tolerance, the processing proceeds to Step SC07. If not, the processing proceeds to Step SC04.

[Step SC04] The controller 5 controls the synchronous motor 2 to move the area of the chip evacuation device 1 in which the chips are considered to remain, which is identified in Step SC01, to the position for cleaning by the cleaning mechanism 7.

[Step SC05] The controller 5 controls the cleaning mechanism 7 to perform the removal (cleaning) of the remaining chips.

[Step SC06] The controller 5 performs Processing 1 (processing for confirming the effect of the cleaning), which will be described later.

[Step SC7] The controller 5 performs Processing 2 (history recording processing), which will be described later, whereupon this processing ends.

FIG. 15 is a flowchart of Processing 1 (processing for confirming the effect of the cleaning) described above.

[Step SD01] The controller 5 determines whether or not to perform confirmation of cleaning conditions after the cleaning is finished. The execution of the confirmation of the cleaning conditions may be made switchable by parameter setting, for example, so that whether or not to perform confirmation processing for the cleaning conditions can be determined by the parameter setting conditions. Moreover, the confirmation processing for the cleaning conditions may be configured to be performed intermittently, that is, performed at regular intervals or each time the cleaning is performed N times, for example. If the cleaning condition confirmation processing is to be performed, the processing proceeds to Step SD02. If not, this processing ends.

[Step SD02] The controller identifies the state of the remaining chips by identifying the loaded conditions or the like of the remaining chip state monitoring mechanism and the synchronous motor 2.

[Step SD03] The controller 5 performs Processing 3 (re-cleaning processing), which will be described later, whereupon this processing ends.

Figure 16:
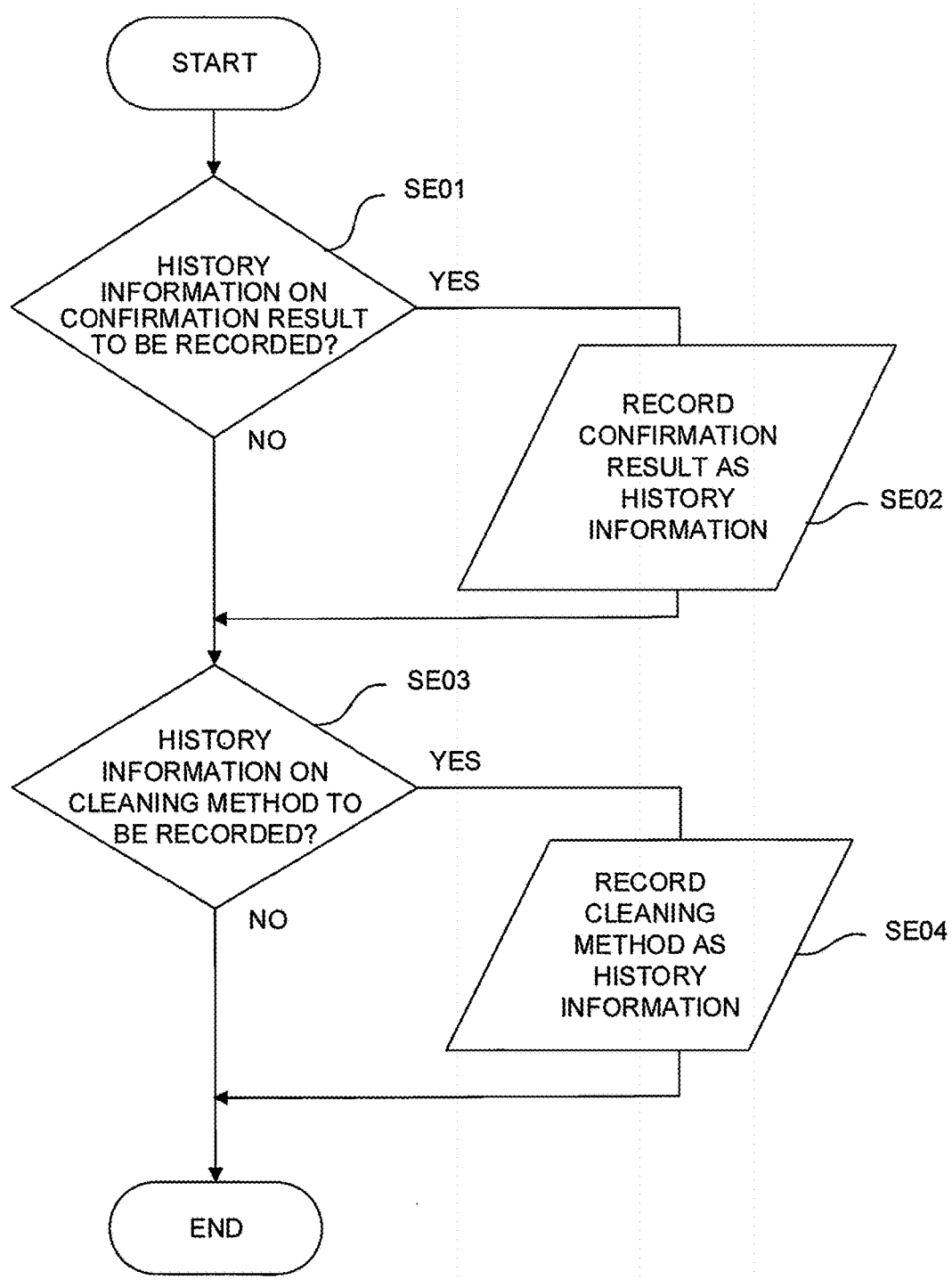
FIG. 16 is a flowchart of history recording processing.

FIG. 16 is a flowchart of Processing 2 (history recording processing) described above.

[Step SE01] The controller 5 determines whether or not to perform recording processing for history information on the result of confirmation of deposition/adhesion conditions of chips on the chip evacuation device 1. The execution of the recording processing for the history information on the confirmation result may be made switchable by parameter setting, for example, so that whether or not to perform the recording processing for the history information on the confirmation result can be determined by the parameter setting conditions. If the recording processing for the history information on the confirmation result is to be performed, the processing proceeds to Step SE02. If not, the processing proceeds to Step SE03.

[Step SE02] The controller 5 records the history information on the result of the confirmation of the deposition/adhesion conditions of the chips on the chip evacuation device 1 in a nonvolatile memory, external storage device or the like.

[Step SE03] The controller 5 determines whether or not to perform recording processing for history information on a performed cleaning method. The execution of the recording processing for the history information on the performed cleaning method may be made switchable by parameter setting, for example, so that whether or not to perform the recording processing for the history information on the performed cleaning method can be determined by the parameter setting conditions. If the recording processing for the history information on the performed cleaning method is to be performed, the processing proceeds to Step SE04. If not, this processing ends.

[Step SE04] The controller 5 records the history information on the performed cleaning method in the nonvolatile memory, external storage device or the like, whereupon this processing ends.

Figure 17:
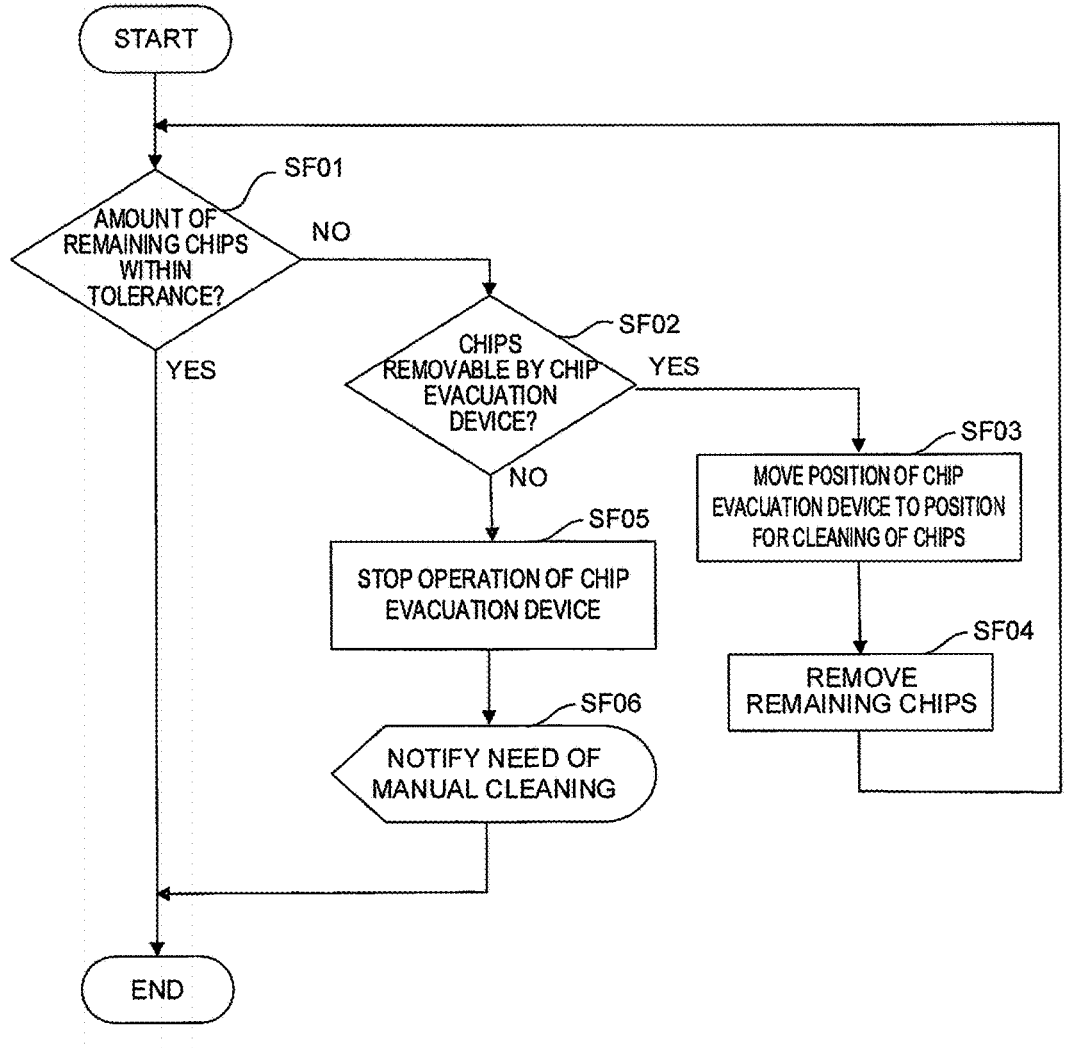
FIG. 17 is a flowchart of re-cleaning processing.
Figure 18:
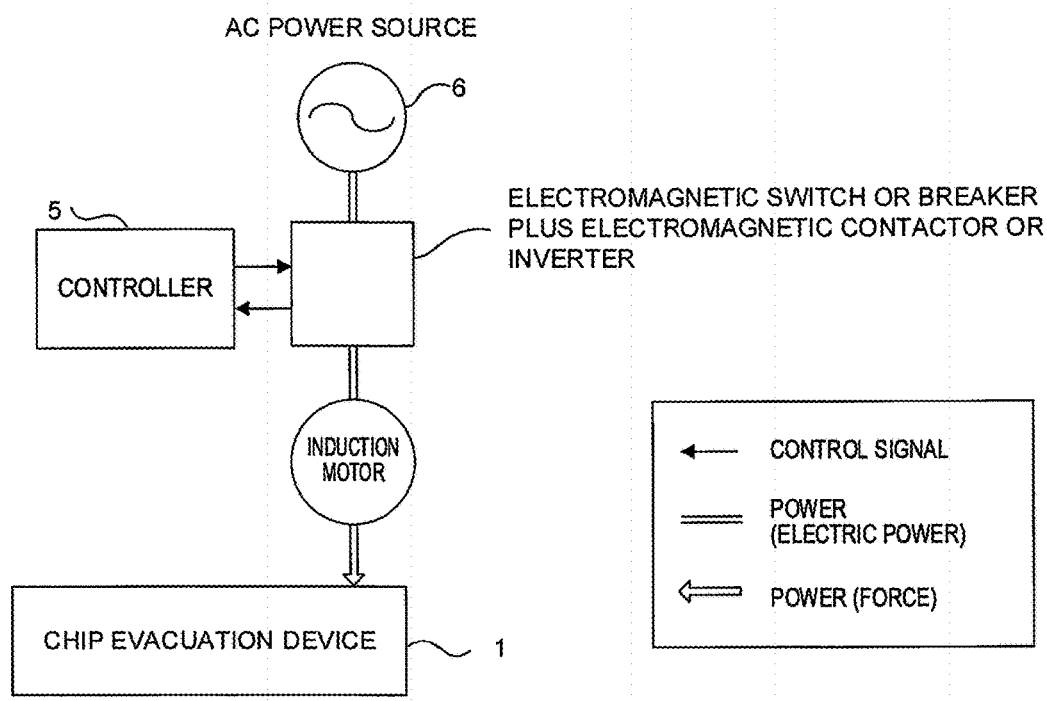
FIG. 18 is a configuration diagram showing a principal part of a prior art chip evacuation device using an induction motor.

FIG. 17 is a flowchart of Processing 3 (re-cleaning processing) described above.

[Step SF01] The controller 5 identifies the state of remaining chips by identifying the loaded conditions or the like of the remaining chip state monitoring mechanism and the synchronous motor 2 and determines whether or not the amount of remaining chips is within a tolerance. If the amount of remaining chips is within the tolerance, this processing ends. If not, the processing proceeds to Step SF02.

[Step SF02] The controller 5 determines whether or not the remaining chips can be removed by the chip evacuation device 1. In the removability determination, the remaining chips may be determined to be non-removable if the amounts of remaining chips does not change before and after the execution of the cleaning or if the chips cannot be removed after the cleaning is repeated a certain number of times, for example. If it is determined that the chips can be removed by the chip evacuation device 1, the processing proceeds to Step SF03. If not, the processing proceeds to Step SF05.

[Step SF03] The controller 5 controls the synchronous motor 2 to move the area of the chip evacuation device 1 in which the chips are considered to remain, which is identified in Step SF01, to the position for cleaning by the cleaning mechanism 7.

[Step SF04] The controller 5 controls the cleaning mechanism 7 to perform the removal (cleaning) of the remaining chips, whereupon the processing proceeds to Step SF01.

[Step SF05] The controller 5 stops the operation of the chip evacuation device 1.

[Step SF06] The controller 5 notifies an operator of the need for manual cleaning by display on a display device, sound, lamp, or the like, whereupon this processing ends.

While an embodiment of the present invention has been described herein, the invention is not limited to the above-described embodiment and may be suitably modified and embodied in various forms.

For example, although the cleaning mechanism 7 comprising the cleaning means such as a wiping unit, extraction unit, and evacuation/suction nozzle has been described in connection with the above-described embodiment, the cleaning mechanism 7 may alternatively be constructed using a wiper, brush, or some other cleaning means. Moreover, the cleaning mechanism 7 may be constructed by combining a plurality of cleaning means.

As a power source for the chip evacuation device 1, an induction motor with a rotation detector and an inverter may be used in place of the synchronous motor 2. Moreover, a drive source for a simple constant-speed, constant-time operation may be used instead. In this case, a mechanism for compensating a shift from the operation of cleaning mechanism 7 should only be provided so that a deviation, if any, between the chip evacuation device 1 and the cleaning mechanism 7 can be compensated.

Methods for determining whether or not to perform the cleaning include the method in which the remaining chips are detected by the image pickup device and the method in which the chips are estimated to remain if a prescribed value is exceeded by a prescribed value at a specific position. Beside these methods, such a method may be used that the execution of the cleaning is determined to be necessary if the load in the synchronous motor 2 always exceeds the prescribed value or varies at a predetermined or higher rate.

While the reflector is used by way of example to recognize the deposition conditions of the chips according to the embodiment described above, a convex or concave mirror may be used as well as a plane mirror for the reflector. Moreover, a refractor may be used instead. In this case, a convex lens may be used to recognize the state of remaining chips in a position that cannot be easily recognized with the resolution of the image pickup device alone, thereby improving the recognition accuracy. Alternatively, a concave lens may be used such that a wide range can be recognized without increasing the short moving distance of the image pickup device. Furthermore, a plurality of reflectors or refractors may be used or a reflector and a refractor may be used in combination with each other.

Moreover, the controller 5 may be configured to perform a cleaning method different from the previously performed cleaning method if it determines to perform re-cleaning after identifying the result of the cleaning. If the chips cannot be cleaned even by the use of the cleaning mechanism comprising the extraction unit, for example, control may be made so that a cleaning mechanism with an evacuation nozzle for evacuating a fluid, such as a working fluid, is used for re-cleaning.

While embodiments of the present invention have been described herein, the invention is not limited to the above-described embodiments and may be suitably modified and embodied in various forms.

The invention claimed is:

1. A machine tool, comprising:
   a chip evacuation device configured to evacuate chips produced in the machine tool to outside;
   a cleaning mechanism for cleaning a part or the whole of the chip evacuation device; and
   a control unit configured to control respective operations of the chip evacuation device and the cleaning mechanism in association with each other, based on a remaining chip state in a drive part of the chip evacuation device.

2. The machine tool according to claim 1, wherein a power source for the chip evacuation device is a synchronous motor.

3. A machine tool with a chip evacuation device configured to evacuate chips produced in the machine tool to outside, the machine tool comprising:
   a cleaning mechanism for cleaning a part or the whole of the chip evacuation device; and
   a control unit configured to control respective operations of the chip evacuation device and the cleaning mechanism in association with each other,
   wherein a power source for the chip evacuation device is a synchronous motor, and
   the machine tool further comprises a remaining chip state monitoring unit configured to monitor a remaining chip state in a drive part of the chip evacuation device, wherein the control unit determines execution of the cleaning of the chip evacuation device based on the result of the monitoring and controls the respective operations of the chip evacuation device and the cleaning mechanism in association with each other based on the result of the determination.

4. The machine tool according to claim 3, wherein the remaining chip state monitoring unit is an image pickup device.

5. The machine tool according to claim 3, wherein the remaining chip state monitoring unit comprises an image pickup device and a reflector and/or a refractor, and the image pickup device monitors the remaining chip state for the chip evacuation device through the reflector and/or the refractor.

6. The machine tool according to claim 3, wherein the remaining chip state monitoring unit uses load information acquired from the synchronous motor.

7. The machine tool according to claim 3, wherein the control unit identifies an area of the chip evacuation device in which the chips remain, based on information from the remaining chip state monitoring unit, and controls the chip evacuation device and the cleaning mechanism to clean the identified remaining chip area.

8. The machine tool according to claim 3, wherein the control unit causes the remaining chip state monitoring unit to identify the result of the cleaning after the cleaning by the cleaning mechanism and issues a notification to the effect that re-cleaning or manual cleaning is necessary, based on the identified result of the cleaning.

9. The machine tool according to claim 8, wherein the control unit performs the re-cleaning by a cleaning method different from a previous cleaning method.

10. The machine tool according to claim 8, wherein the control unit stores as history information a record on identification of the remaining chip state and/or the content of the cleaning performed based on the result of the identification.

11. A machine tool with a chip evacuation device configured to evacuate chips produced in the machine tool to outside, the machine tool comprising:
    a cleaning mechanism for cleaning a part or the whole of the chip evacuation device; and
    a control unit configured to control respective operations of the chip evacuation device and the cleaning mechanism in association with each other,
    wherein the control unit is a controller installed outside the machine tool.

12. The machine tool according to claim 1, wherein the cleaning mechanism is movable by an automatic conveying device.

13. The machine tool according to claim 4, wherein the image pickup device is movable by an automatic conveying device.

14. The machine tool according to claim 5, wherein the image pickup device and the reflector and/or the refractor are movable by an automatic conveying device.

15. The machine tool according to claim 12, wherein the automatic conveying device is a robot.

* * * * *